US011208017B2

(12) United States Patent
Buljan et al.

(10) Patent No.: US 11,208,017 B2
(45) Date of Patent: Dec. 28, 2021

(54) MOTOR VEHICLE SEAT, MOTOR VEHICLE EQUIPPED THEREWITH AND METHOD FOR ADJUSTING A COVER TENSION OF THE MOTOR VEHICLE SEAT

(71) Applicant: Bayerische Motoren Werke Aktiengesellschaft, Munich (DE)

(72) Inventors: Mario Buljan, Feldkirchen (DE); Renato Martic, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/969,388

(22) PCT Filed: Jan. 23, 2019

(86) PCT No.: PCT/EP2019/051627
§ 371 (c)(1),
(2) Date: Aug. 12, 2020

(87) PCT Pub. No.: WO2019/158329
PCT Pub. Date: Aug. 22, 2019

(65) Prior Publication Data
US 2020/0398719 A1 Dec. 24, 2020

(30) Foreign Application Priority Data

Feb. 16, 2018 (DE) .................... 10 2018 202 390.5

(51) Int. Cl.
*B60N 2/58* (2006.01)
*B60N 2/72* (2006.01)
*B60N 2/02* (2006.01)

(52) U.S. Cl.
CPC ............ *B60N 2/72* (2013.01); *B60N 2/0244* (2013.01); *B60N 2/5841* (2013.01); *B60N 2002/026* (2013.01)

(58) Field of Classification Search
CPC ....... B60N 2002/026; B60N 2/58; B60N 2/60
See application file for complete search history.

(56) References Cited

U.S. PATENT DOCUMENTS 2,177,986 A    10/1939   James
2,930,053 A     3/1960   Nowels
(Continued)

FOREIGN PATENT DOCUMENTS

AT     56 760 E         12/1912
AT     521957 B1  *     7/2020   ........... B60N 2/6027
(Continued)

OTHER PUBLICATIONS

International Search Report (PCT/ISA/210) issued in PCT Application No. PCT/EP2019/051627 dated Apr. 11, 2019 with English translation (five (5) pages).
(Continued)

*Primary Examiner* — Timothy J Brindley
(74) *Attorney, Agent, or Firm* — Crowell & Moring LLP

(57) ABSTRACT

To improve comfort, a motor vehicle seat has at least one cushion body, at least one cover concealing the cushion body at least in part, and at least one tensioner, which is operatively connected to the cover by a first end and is designed to adjust the cover tension. The tensioner is fixed by a second end to a clamping device. The clamping device is designed to modify and fix the distance of the tensioner from the first end thereof to the second end thereof and the clamping device is designed to be operated after completion of the motor vehicle seat.

14 Claims, 3 Drawing Sheets

(56) References Cited

U.S. PATENT DOCUMENTS

| | | |
|---|---|---|
| 5,176,424 A | 1/1993 | Tobita et al. |
| 5,606,778 A | 3/1997 | Jungkind |
| 2006/0277950 A1 | 12/2006 | Rock |
| 2015/0121669 A1 | 5/2015 | Jungkind |
| 2016/0067131 A1 | 3/2016 | Hillenbrand, II et al. |
| 2017/0313228 A1 | 11/2017 | Liu |
| 2018/0035760 A1 | 2/2018 | Bock |

FOREIGN PATENT DOCUMENTS

| | | | |
|---|---|---|---|
| DE | 868 713 B | 2/1953 | |
| DE | 42 40 916 C1 | 10/1993 | |
| DE | 297 01 491 U1 | 7/1998 | |
| DE | 10 2005 060 481 A1 | 6/2007 | |
| DE | 102008053662 A1 * | 5/2010 | ........... B60N 2/5825 |
| EP | 1 193 118 A2 | 4/2002 | |
| GB | 388490 A | 3/1933 | |
| GB | 2 405 580 A | 3/2005 | |
| JP | 55-104955 U | 7/1980 | |
| JP | 57-194120 A | 11/1982 | |
| JP | 2012-228899 A | 11/2012 | |
| WO | WO-2008072465 A1 * | 6/2008 | ............. B60N 2/585 |
| WO | WO 2014/082652 A1 | 6/2014 | |
| WO | WO 2014/109646 A1 | 7/2014 | |
| WO | WO 2017/059875 A1 | 4/2017 | |

OTHER PUBLICATIONS

German-language Written Opinion (PCT/ISA/237) issued in PCT Application No. PCT/EP2019/051627 dated Apr. 11, 2019 (seven (7) pages).

German-language Search Report issued in German Application No. 10 2018 202 390.5 dated Jan. 16, 2019 with partial English translation (13 pages).

* cited by examiner

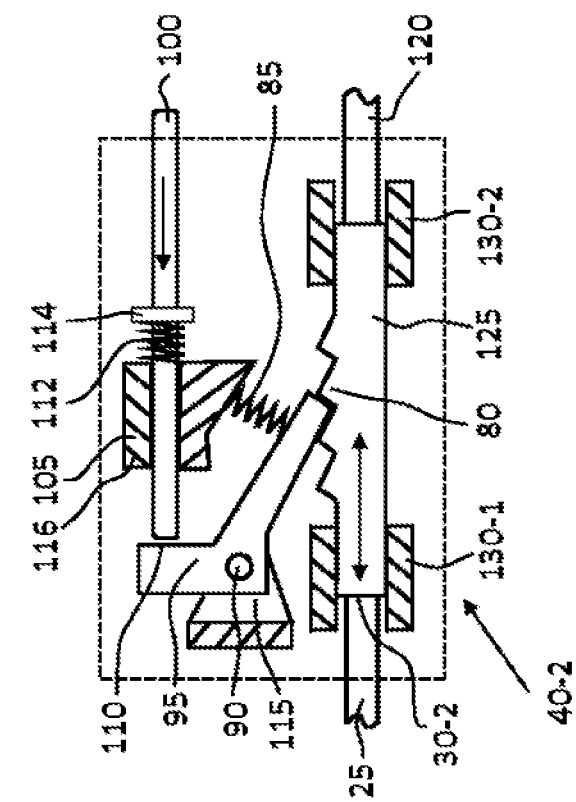
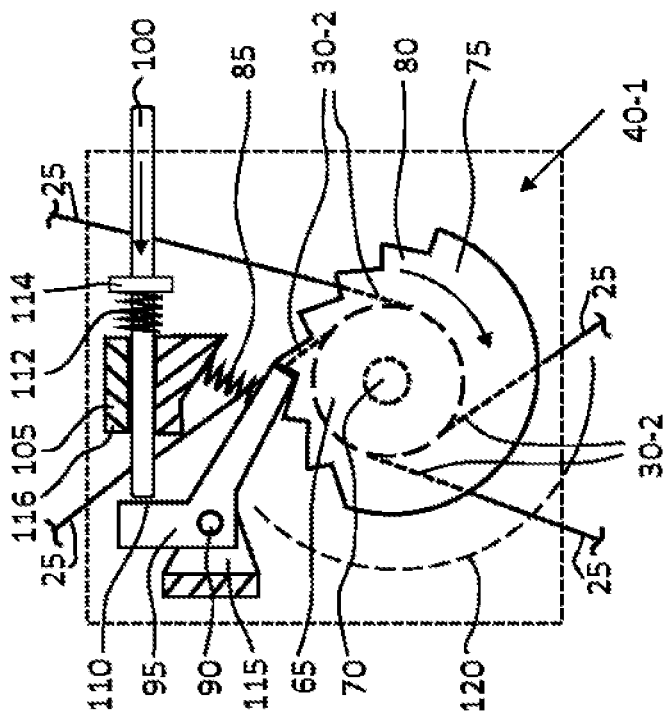
Fig. 3A
Fig. 3B

MOTOR VEHICLE SEAT, MOTOR VEHICLE EQUIPPED THEREWITH AND METHOD FOR ADJUSTING A COVER TENSION OF THE MOTOR VEHICLE SEAT

BACKGROUND AND SUMMARY OF THE INVENTION

The present invention relates to a motor vehicle seat, to a motor vehicle equipped therewith, and to a method for adjusting a cover tension of such a motor vehicle seat.

DE 10 2005 060 481 A1 discloses a motor vehicle seat having at least one cushion body, at least one cover at least partially concealing the latter, and at least one tensioner, which is operatively connected by a first end to the cover and is designed to adjust the cover tension. The adjustment serves to avoid creasing or rippling of the cover caused by stretching of the material and sewing tolerances and is undertaken once during the production of the motor vehicle seat.

It is an object of the present invention to specify technical measures with which the cover tension of a completed motor vehicle seat can be increased as desired, kept constant or reduced, in particular by the user of the motor vehicle seat.

This object is achieved by a motor vehicle seat, by a motor vehicle equipped therewith, and by a method for adjusting a cover tension of such a motor vehicle seat, according to the claimed invention.

The motor vehicle seat according to the invention has at least one cushion body, at least one cover at least partially concealing the latter, and at least one tensioner, which is operatively connected by a first end to the cover and is designed to adjust the cover tension. The motor vehicle seat is distinguished in that the tensioner is fastened by a second end to a clamping device with which the distance of the tensioner from its first end to its second end, i.e. its relative distance or the length of the tensioner between the first end and the second end, can be changed and can be fixed in the changed position. The clamping device is operated after completion of the motor vehicle seat. In an advantageous manner, it is made possible with relatively uncomplicated means to adjust the tension of the cover to be greater, identical or lesser in comparison to a reference by means of a relative change in length of the tensioner. The adjustment itself can be undertaken by the user of the motor vehicle seat or by another person, and therefore the seating comfort can be adapted over the course of time or depending on the person.

According to a preferred embodiment, the clamping device is configured as a rotary clamping device or a tensioning clamping device. It is thereby possible in an advantageous manner to provide an optimum clamping device for each application, desired design of the motor vehicle seat, or desired location of attaching the clamping device to the motor vehicle seat or reachability of said clamping device.

A simple design of a rotary clamping device is achieved in an advantageous manner if it has a clamping roller which is mounted rotatably about an axis of rotation and on which the tensioner is formed in a manner such that it can be partially wound up, a drive which is designed to drive the clamping roller, and a latch which is designed to block or to release the clamping roller in a desired position by means of a force fit, form fit and/or frictional lock.

This applies even more so if the clamping roller has at least one blocking tooth and the latch has at least one blocking lever, which blocking lever is in engagement with at least one blocking tooth in a latching position and is disengaged from the blocking tooth in a tightening position in which the cover is not clamped.

It should be noted that the previously disclosed embodiments of a rotary clamping device are preferred embodiments. It is likewise possible in an advantageous manner to use other known rotary clamping device, as are known in particular from WO 2014/082652 A1, WO 2017/059875 A1, DE 297 01 491 U1 and DE 42 40 916 C1.

According to the invention, and alternatively or additionally to the rotary clamping device, a tensioning clamping device can be provided with at least one latch which is configured such that it can be received in a corresponding receiving device in a force-fitting and/or form-fitting and/or frictionally blocking manner.

For the purpose of particularly simple operability of the device according to the invention, it is provided in an advantageous manner that the clamping device is arranged on the rear side of the motor vehicle seat.

According to a preferred embodiment, the tensioner is fastened to the cover and/or to a nonwoven material profile fastened to the cover, as a result of which a large number of different motor vehicle seats can be equipped in an advantageous manner according to the invention.

According to a further preferred embodiment, the tensioner is configured as a loop which extends through the cover and/or a nonwoven material profile fastened to the cover and is fastened by its respective ends to the clamping device. This advantageously creates a motor vehicle seat according to the invention, the cover tension of which can be adjusted over a large surface area using simple means.

The object presented previously is likewise achieved by a motor vehicle having at least one motor vehicle seat of the previously disclosed type. The corresponding advantages apply appropriately.

The cover tension can basically be adjusted manually. However, according to a preferred embodiment, an electric drive can be provided which is operatively connected to onboard electronics located in the motor vehicle. By means of an input device connected to the onboard electronics, it is possible in an advantageous manner to move the electric drive in order to increase or to reduce the cover tension as desired. The input itself can be undertaken manually by means of a button, a switch, a surface sensor or the like, or by means of a signal which is output by a computer device, which computer device is located in the motor vehicle itself or outside same. In particular, it is possible to undertake a control or regulation of the electric drive by means of data which are transmitted by radio signals.

The previously presented object is likewise achieved by a method for adjusting a cover tension of at least one motor vehicle seat of the previously disclosed type which is located in a motor vehicle. The corresponding advantages apply appropriately.

The method which, in an advantageous manner, is to be carried out simply has the following steps:

a) defining a desired value representing a desired cover tension;

b) measuring a cover tension currently present at a point in time;

c) comparing the currently present cover tension with the desired value;

d) when the measured cover tension is smaller than the desired value, reducing the distance of the tensioner from its first end to its second end;

e) when the measured cover tension is greater than the desired value, increasing the distance of the tensioner from its first end to its second end.

According to a preferred embodiment of the method, the desired value is selected depending on a value representing the state of the motor vehicle. In an advantageous manner, the comfort of the motor vehicle seat can thereby be selected, in particular depending on a selected or desired acceleration and/or inclination of the motor vehicle or when a user of the motor vehicle seat enters or exits the motor vehicle.

A detailed, nonprejudicial, in particular nonlimiting, description of exemplary embodiments of the present invention is given below with reference to the attached figures, which are not to scale. Identical elements are provided with identical reference signs, unless indicated otherwise.

BRIEF DESCRIPTION OF THE DRAWINGS

FIGS. 3A and 3B are symbolic illustrations of a rotary clamping device and tensioning clamping device, respectively.

DETAILED DESCRIPTION OF THE DRAWINGS

Figure 1B:
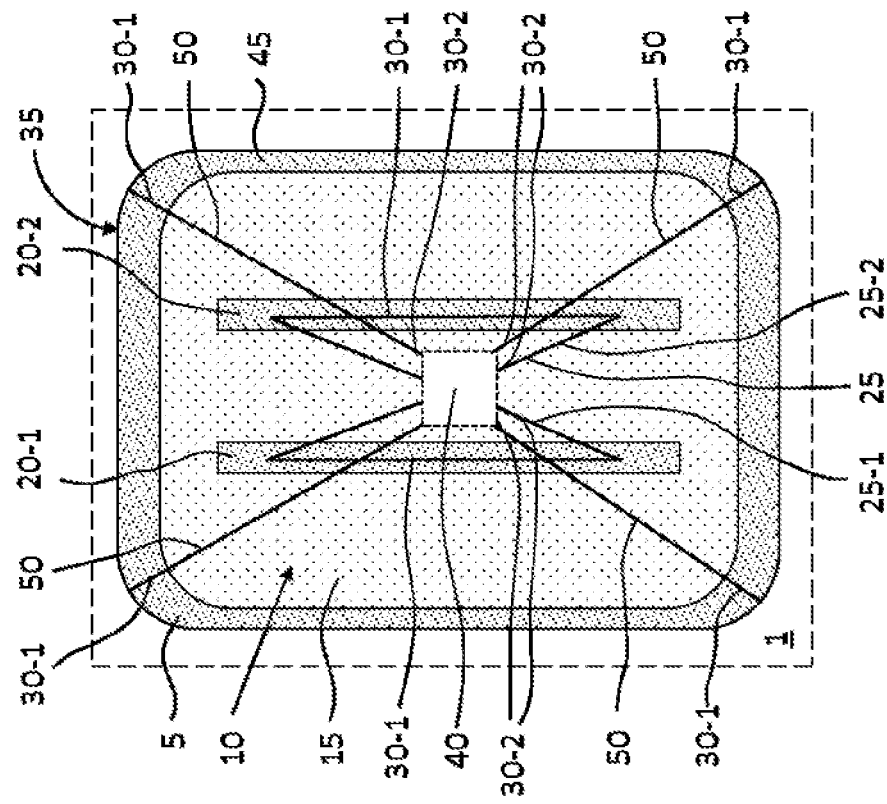
FIGS. 1A and 1B show a first and a second embodiment of a backrest of a motor vehicle seat according to the invention in a symbolic rear view.
Figure 1A:
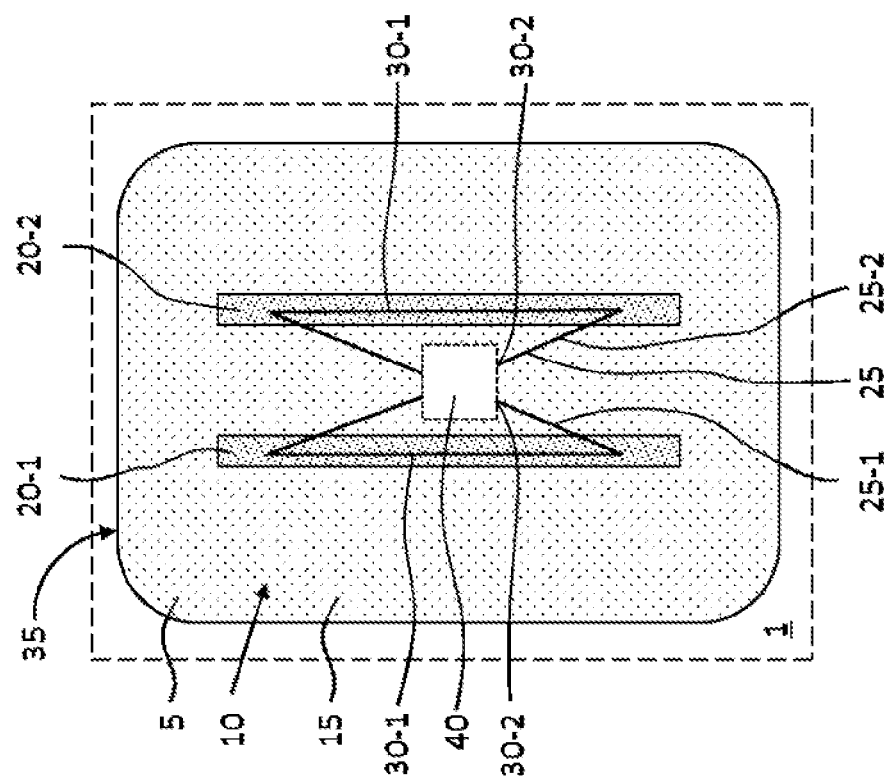

FIG. 1A illustrates a motor vehicle 1 with a backrest 5, shown schematically in a rear view, of a motor vehicle seat 10. The backrest 5 has a cushion body 15 which is formed from foam and in which a first nonwoven material profile 20-1 and a second nonwoven material profile 20-2 are inserted. A tensioner 25 is located within the cushion body 15 and the two nonwoven material profiles 20-1, 20-2, said tensioner 25 being guided with a first loop 25-1 through the first nonwoven material profile 20-1 and with a second loop 25-2 through the second nonwoven material profile 20-2. The first loop 25-1 and second loop 25-2 are operatively connected or fastened by a first end 30-1 to a cover 35, which will be described later. The first loop 25-1 and second loop 25-2 are operatively connected to a clamping device 40, which will also be described below, or are fastened thereto, by a second end 30-2. With this configuration of the motor vehicle seat 10, it is possible to adjust the cover tension of the cover 35 in the region of the surface area of the backrest 5.

An alternative embodiment of the motor vehicle seat 10 to the embodiment shown in FIG. 1A is shown in FIG. 1B. Next to the components of the motor vehicle seat 10 that are described in FIG. 1A there is a further nonwoven material part 45 which is arranged around the cushion body 15 and to the corners of which a first end 30-1 of a tensioner 50 is in each case fastened. In this case, the respective tensioner 50 are not configured as loops, but rather in the manner of cable pulls and are fastened by their second ends 30-2 opposite the respective first end 30-1 to the clamping device 40. Unlike in the exemplary embodiment according to FIG. 1A, the cover tension of the cover 35 can thereby not only be adjusted in the region of the surface area, but overall.

Figure 2C:
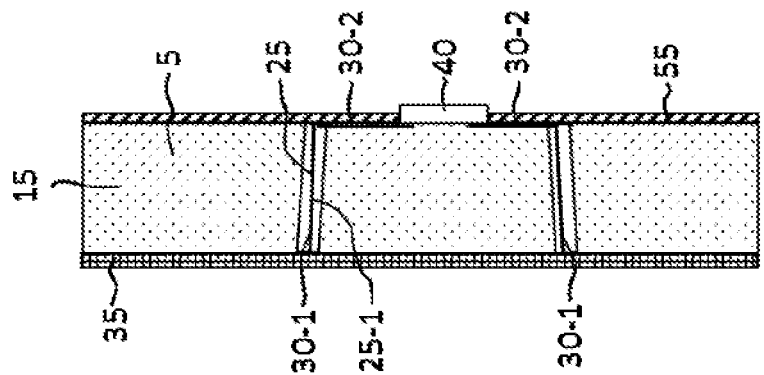
FIGS. 2A to 2C show three different embodiments of a backrest of a motor vehicle seat according to the invention in a symbolic side view.
Figure 2B:
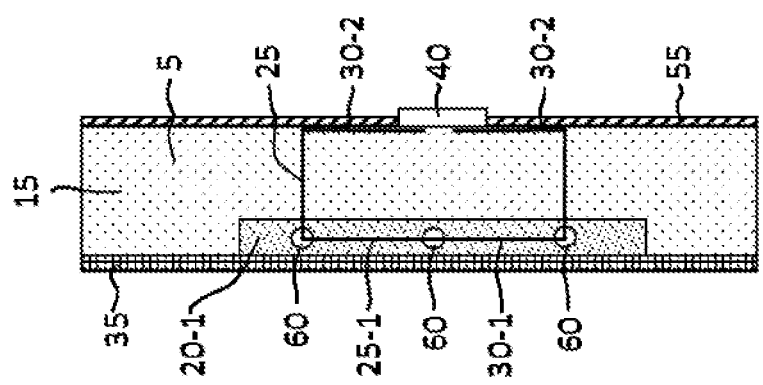
Figure 2A:
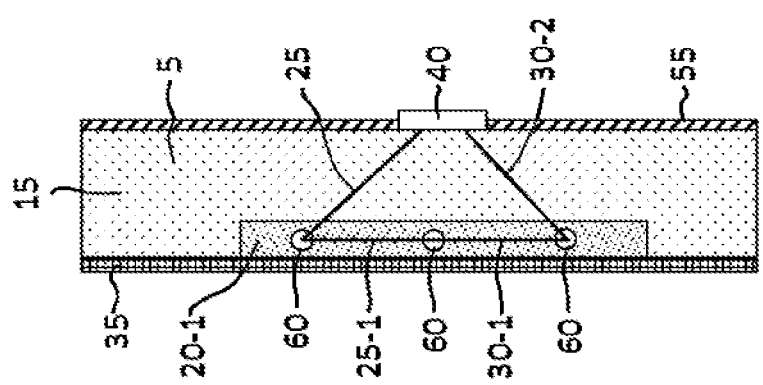

The backrest 5 which is shown in a rear view in FIG. 1A is shown once again in FIG. 2A in a side view. As can be seen, on the side of the backrest 5 opposite the cover 35 there is a reinforcing panel 55 or a back panel to which the clamping device 40 is fastened. The first loop 25-1 of the tensioner 25 is guided in channels 60 which are located in the first nonwoven material profile and in which the tensioner 25 moves in a controlled manner during an adjustment operation of the clamping device 40.

FIG. 2B shows an alternative embodiment to the embodiment shown in FIG. 2A, in which the guiding of the tensioner 25 is no longer formed by ends 30-2 of the tensioner 25 converging obliquely with respect to one another. On the contrary, the second ends 30-2 of the tensioner 25 are oriented substantially parallel to the first ends 30-1 thereof.

Also in the embodiment which is shown in FIG. 2C and which is an alternative embodiment to the embodiments of FIGS. 2A and 2B, the second ends 30-2 of the first loop 25-1 of the tensioner 25 run, from the clamping device 40, first of all parallel to the reinforcing panel 55 in order then to bend substantially parallel to the upper or lower side of the cushion body in the direction of the cover 35 in the cushion body 15. Unlike in the previous embodiments of FIGS. 2A and 2B, the channels 60, however, run substantially orthogonally to the cover 35. The channels 60 respectively accommodate the first ends 30-1 which, for their part, are fastened to the cover 35 directly and omitting the nonwoven material profile 20-1 or 20-2. This type of direct fastening affords the advantage that wire nonwoven material profiles which are provided and are known per se in the backrest 5 and are not shown here can be omitted.

The design of a clamping device 40 will now be explained by way of example with reference to FIGS. 3A and 3B, where FIG. 3A symbolically illustrates a rotary clamping device 40-1 and FIG. 3B a tensioning clamping device 40-2.

The rotary clamping device 40-1 shown in FIG. 3A has a clamping roller 65 which is mounted rotatably about an axis 70. The respective second ends 30-2 of four tensioners 25 are fastened to the clamping roller 65 in such a manner that such tensioners are wound up on the clamping roller 65 during a rotation of the clamping roller 65 in the clockwise direction (cf. curved arrow) about the axis 70. In this case, the relative length of the respective tensioners 25 with respect to the respective first end 30-1 is shortened and the cover 35 is clamped.

In order to prevent an unintentional unclamping of the cover 35, part of the clamping roller 65 is provided with a plate 75, the radius of which is greater than the radius of that part of the clamping roller 65 which receives the tensioners 25 and the outer circumference of which has a number of blocking teeth 80 (only a few of which are depicted for reasons of better clarity). A blocking lever 95 which is pretensioned by means of a spring 85 and is mounted pivotably about a pivot axis 90 lies against one of the blocking teeth 80 in such a manner that a restoring movement of the clamping roller 65 because of a tensile force exerted on the tensioners 25 by the cover 35 is prevented. During a rotational movement of the clamping roller 65 in the clockwise direction, the blocking lever 95 acts counter to the spring 85 and releases the blocking tooth 80 adjacent to said blocking lever. The clamping roller 65 moves further until the blocking lever 95 rests on the next blocking tooth 80 because of the force exerted by the spring 85 and locks said blocking tooth again.

In order to entirely or partially unclamp the cover 35, a pressure rod 100 is mounted on the rotary clamping device 40 in a bearing 105 in a translatory manner such that its left end in FIG. 3A comes to lie against a supporting surface 110 located on the blocking lever 95 during a movement in the direction of the straight arrow. By this means, the blocking lever 95 is raised counter to the force exerted by the spring 85 via the blocking tooth 80, which lies against said blocking lever, and the tensioners 25 are unwound from the clamping roller 65 in the counterclockwise direction (i.e. counter to the direction of the curved arrow) because of the force exerted by the cover 35. For the purpose of renewed clamping of the cover 35, the pressure rod 100 is moved away from the supporting surface 110 counter to the direction shown of the straight arrow such that the blocking lever 95 again comes to lie against a blocking tooth 80 because of the force exerted by the spring 85. For the purpose of an easier restoring movement of the pressure rod 100, a spring 112 is provided which, firstly, lies against the bearing 105 and, secondly, against a stop 114 located on the pressure rod 100. During a movement of the pressure rod 100 in the direction shown of the straight arrow, the spring 112 is pretensioned. If the pressure rod 100 is no longer moved in said direction, the spring 112 presses against the stop 114 and moves the latter together with the pressure rod 100 back into its starting position.

In other words, the blocking lever 90 which is mounted pivotably about the pivot axis 90 and is pretensioned by means of spring 85 forms, next to the supporting surface 110, a latch 115 which is in engagement with one of the blocking teeth 80 in a latching position and is disengaged from the blocking tooth 80 in a tightening position, when the tensioner 25 is clamped, or in a release position, when the tensioner 25 is not clamped. The pressure rod 100 which is guided in a translatory manner in the bearing 105, together with the spring 112 and the stop 114, forms an unlocking device 116.

The rotary clamping device 40-1 shown in FIG. 3A is rotated manually about the axis 70. For this purpose, said rotary clamping device has a circular drive 120 which is configured in the form of a hand wheel, is only partially depicted for reasons of better clarity and is oriented concentrically with respect to the axis 70. A manually actuated rotation of the drive 120 in the clockwise direction is therefore converted into a rotational movement of the clamping roller 65 in the clockwise direction.

The tensioning clamping device 40-2 shown in FIG. 3B likewise has the latch 115 and an unlocking device 116 that are shown in FIG. 3A. In this case, the blocking lever 95 acts against a receiving device 125 which is configured in the form of a rack, has blocking teeth 80 and is accommodated in two bearings 130-1 and 130-2 in a translatorily movable manner. A second end 30-2 of a tensioner 25, only partially shown, is accommodated on that portion of the receiving device 125 which is on the left in FIG. 3B. A drive 120, only partially shown, which has a loop, not shown here, on the end side is shown on the portion of the receiving device 125 that is on the right in FIG. 3B. If a user, likewise not shown here, pulls on the loop, the receiving device 125 moves to the right in FIG. 3B, the relative length of the tensioner 25 between the first end 30-1 and the second end 30-2 is shortened and the cover 35 is tensioned. If the user no longer pulls on the loop, a blocking tooth 80 comes to lie against the blocking lever 95 which—as basically already explained with respect to FIG. 3A—because of the pretensioning of the spring 85 prevents a further movement of the tensioner 25 and defines the cover tension of the cover 35. For the purpose of unlocking the latch 115, the pressure rod 100 merely needs to be actuated in the direction on the left in FIG. 3B, as has already been explained with respect to FIG. 3A.

The previously described tensioner 25 can be composed of any suitable material, in particular of metal or a plastic, and can be configured in particular in the form of wires, cables or threads.

As can be gathered from FIGS. 1A to 3B, the latch 115 and unlocking device 116 can be blocked or released by means of a form fit and force fit. However, this is not compulsory; on the contrary, a clamping locking connection or frictionally locking connection may also be provided.

A manual actuation of the drive 120 has been described with reference to FIGS. 1A to 3B. However, it is likewise possible to provide an electric or electric-motor actuation of the drive 120, the latch 115 and/or unlocking 116, wherein these can be driven by at least one electric drive, not shown here, in particular an electric motor. The drive can be operatively connected to onboard electronics, which are known per se and are likewise not shown here, of the motor vehicle 1 in such a manner that, by means of a signal output by the onboard electronics, the drive 120 is driven and the unlocking device 116 moved in order to permit a movement of the rotational roller 65 or of the receiving device 125.

Furthermore, it is possible, when onboard electronics are incorporated in the previously mentioned manner, to automatically control or regulate the cover tension of the cover 35 of the motor vehicle seat 10, wherein the following steps should be carried out:

a) defining a desired value representing a desired cover tension;

b) measuring a cover tension currently present at a point in time;

c) comparing the currently present cover tension with the desired value;

d) when the measured cover tension is smaller than the desired value, reducing the relative distance of the tensioner 25, 50 from its first end 25-1 to its second end 25-2;

e) when the measured cover tension is greater than the desired value, increasing the relative distance of the tensioner 25, 50 from its first end 25-1 to its second end 25-2.

It should be noted that not only the backrest 5 of the motor vehicle seat 10, but alternatively or cumulatively the seat cushion, not shown here, of the motor vehicle seat can be configured in accordance with the previously presented embodiments of the backrest 5.

LIST OF REFERENCE SIGNS

1 Motor vehicle
5 Backrest
10 Motor vehicle seat
15 Cushion body
20-1 First nonwoven material profile
20-2 Second nonwoven material profile
25 Tensioner
25-1 First loop
25-2 Second loop
30-1 First end
30-2 Second end
35 Cover
40 Clamping device
40-1 Rotary clamping device
40-2 Tensioning clamping device
45 Nonwoven material part
50 Tensioner
55 Reinforcing panel
60 Channels
65 Clamping roller
70 Axis 75 Plate
80 Blocking teeth
85 Spring
90 Pivot axis
95 Blocking lever
100 Pressure rod
105 Bearing
110 Supporting surface
112 Spring
114 Stop
115 Latch
116 Unlocking device
120 Drive
125 Receiving device
130-1 Bearing
130-2 Bearing

What is claimed is:

1. A motor vehicle seat, comprising:
    at least one cushion body;
    at least one cover at least partially concealing the cushion body;
    at least one tensioner, which is operatively connected by a first end to the cover and is designed to adjust a cover tension, wherein
    the tensioner is fastened by a second end to a clamping device,
    the clamping device is designed to change and to fix a distance of the tensioner from its first end to its second end,
    the clamping device is designed to be operated after completion of the motor vehicle seat; and
    the clamping device comprises:
        a clamping roller which is mounted rotatably about an axis of rotation and on which the tensioner is formed in a manner such that the tensioner can be partially wound up,
        a drive which is designed to drive the clamping roller, and
        a latch which is designed to block or release the clamping roller in a desired position by pivoting.

2. The motor vehicle seat according to claim 1, wherein the clamping roller comprises a plurality of blocking teeth, and
the latch has at least one pivotable blocking lever, which pivotable blocking lever is in engagement with at least one blocking tooth in a latching position and is disengaged from the blocking tooth in a tightening position.

3. A motor vehicle seat comprising
    at least one cushion body,
    at least one cover at least partially concealing the cushion body;
    at least one tensioner, which is operatively connected by a first end to the cover and is designed to adjust a cover tension, wherein
    the tensioner is fastened by a second end to a clamping device,
    the clamping device is designed to change and to fix a distance of the tensioner from its first end to its second end, and
    the clamping device is designed to be operated after completion of the motor vehicle seat; and
    at least one latch which is designed such that the latch can be received in a corresponding rack in a force-fitting, form-fitting and/or frictionally blocking manner.

4. The motor vehicle seat according to claim 1, wherein the clamping device is arranged on a rear side of the motor vehicle seat.

5. The motor vehicle seat according to claim 1, wherein the tensioner is fastened to the cover and/or to a nonwoven material profile fastened to the cover.

6. The motor vehicle seat according to claim 1, wherein the tensioner is configured as a loop which extends through the cover and/or a nonwoven material profile fastened to the cover and is fastened by a respective end to the clamping device.

7. The motor vehicle seat according to claim 1, further comprising:
    an electric drive, wherein
    the clamping device is operatively connected to the electric drive.

8. A motor vehicle comprising at least one motor vehicle seat according to claim 1.

9. The motor vehicle according to claim 8, further comprising:
    an electric device, wherein the clamping device is operatively connected to the electric drive, and
    the electric drive is operatively connected to onboard electronics located in the motor vehicle.

10. A method for adjusting a cover tension of a motor vehicle seat located in a motor vehicle, the motor vehicle seat comprising at least one cushion body, at least one cover at least partially concealing the cushion body, at least one tensioner, which is operatively connected by a first end to the cover and is designed to adjust a cover tension, wherein the tensioner is fastened by a second end to a clamping device, the clamping device is designed to change and to fix a distance of the tensioner from its first end to its second end, and the clamping device is designed to be operated after completion of the motor vehicle seat, wherein the method comprises:
    defining a desired value representing a desired cover tension of the cover;
    measuring a cover tension currently present at a point in time;
    comparing the currently present cover tension with the desired value;
    when the measured cover tension is smaller than the desired value, reducing the distance of the tensioner from its first end to its second end; and
    when the measured cover tension is greater than the desired value, increasing the distance of the tensioner from its first end to its second end.

11. The method according to claim 10, wherein the desired value is selected depending on a value representing a state of the motor vehicle.

12. The motor vehicle seat according to claim 3, wherein the rack is linearly movable via a drive.

13. The motor vehicle seat according to claim 12, wherein the rack comprises a plurality of blocking teeth.

14. The motor vehicle seat according to claim 3, wherein the latch comprises a pivotable blocking lever designed to block or release the rack in a desired position.

* * * * *